United States Patent [19]
Booth

[11] 3,925,795
[45] Dec. 9, 1975

[54] MECHANISM FOR CONTROLLING THE POSITIONING OF A DIAPHRAGM WITHIN A CAMERA

[75] Inventor: Walter A. Booth, Springfield, N.J.
[73] Assignee: Berkey Photo, Inc., Paramus, N.J.
[22] Filed: Jan. 7, 1974
[21] Appl. No.: 431,480

[52] U.S. Cl. .................................. 354/139; 354/149
[51] Int. Cl.² .......................................... G03B 15/03
[58] Field of Search ........... 354/139, 149, 126, 270, 354/141, 145

[56] References Cited
UNITED STATES PATENTS
3,259,043  7/1966  Pagel ........................ 354/139 X R FOREIGN PATENTS OR APPLICATIONS
1,285,293  12/1968  Germany ............................ 354/141
1,217,203  5/1966  Germany ............................ 354/129

Primary Examiner—John M. Horan

[57] ABSTRACT

A camera mechanism is provided which is adapted to work in combination with the shutter release and strobe light of a camera so as to effect control of the intensity of the light exposure within the film chamber of the camera. The mechanism includes an on-off switch and a diaphragm means which is adapted to assume either an operative position wherein it is disposed intermediate the lens and film chamber and coaxial with the optical axis of the lens, or an inoperative position wherein the diaphragm means is substantially out of registration with the area of the lens. The diaphragm means is provided with an opening of fixed dimension but of a lesser area than the lens. The positioning of the diaphragm means is controlled by the adjustment of the on-off switch which, in turn, determines whether the strobe light will be energized when the shutter release is manually manipulated.

3 Claims, 4 Drawing Figures

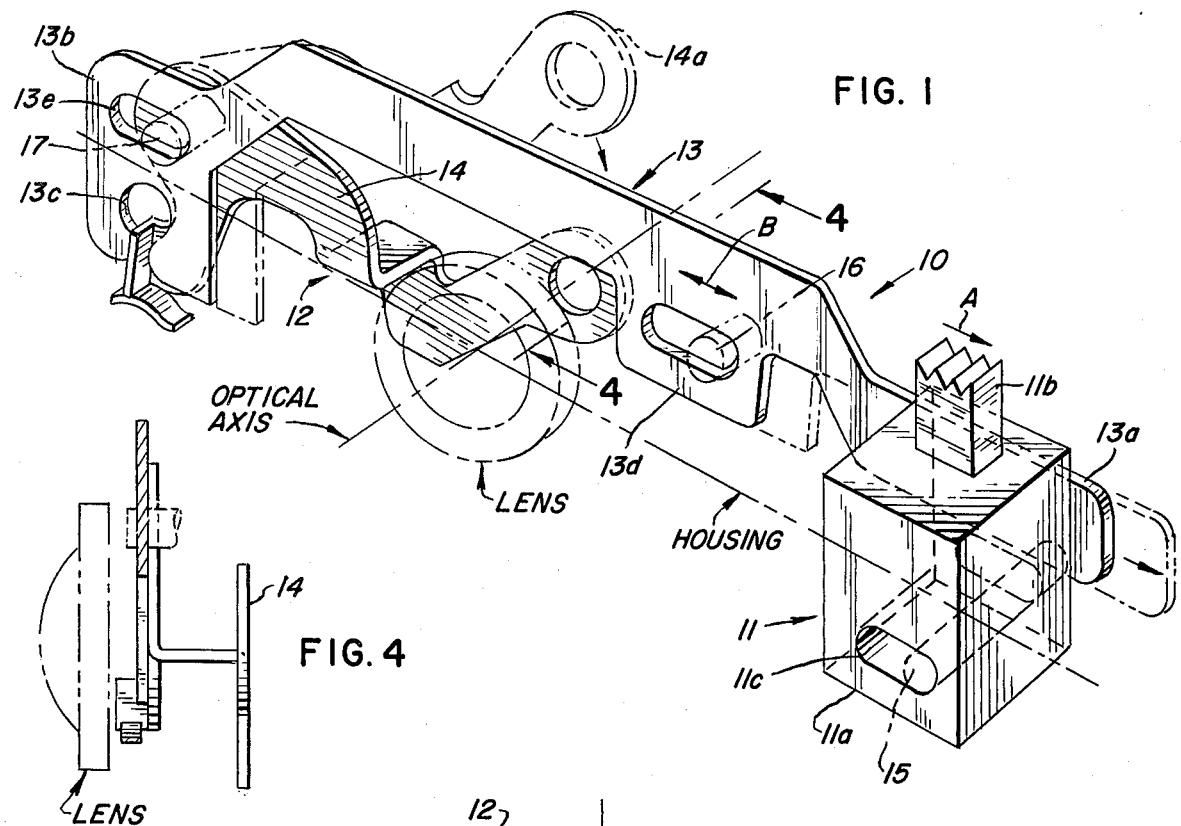
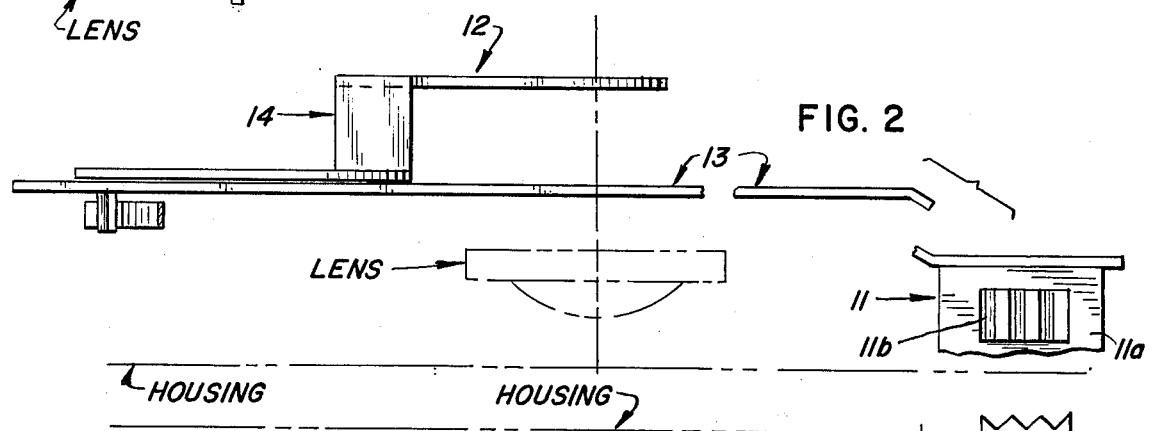
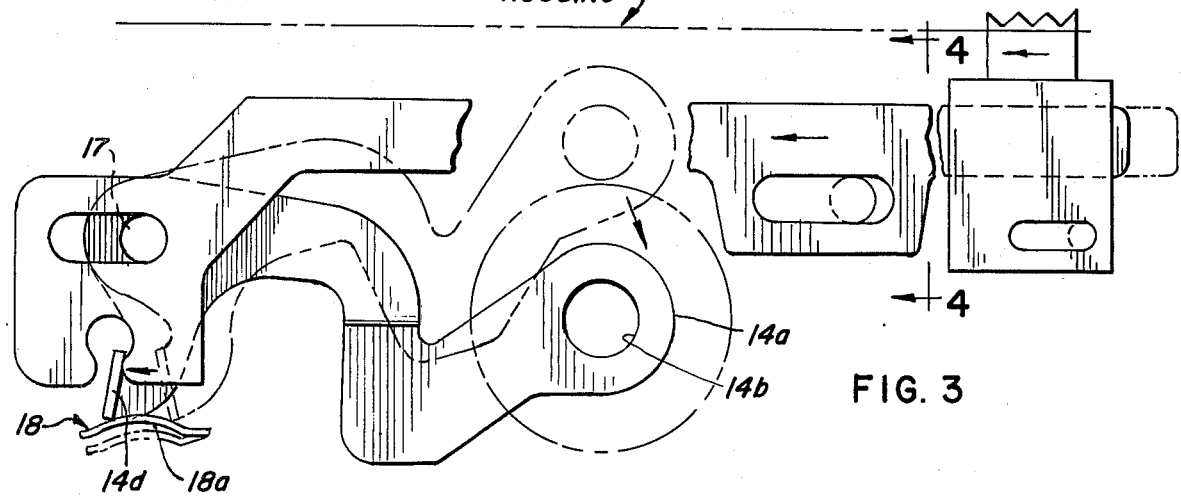

3,925,795

MECHANISM FOR CONTROLLING THE POSITIONING OF A DIAPHRAGM WITHIN A CAMERA

BACKGROUND OF THE INVENTION

Various light control mechanisms have heretofore been provided; however, because of certain design characteristics, they have been beset with one or more of the following shortcomings: (a) the mechanism is of a costly, complex and fragile construction; (b) the camera becomes bulky, unbalanced and awkward to manipulate; (c) the operating procedure for the mechanism and the camera as a whole is difficult to understand and follow; and (d) the mechanism is not foolproof and will not automatically control the light intensity within the camera interior so as to compensate for the type of light source being used to illuminate the subject being photographed.

SUMMARY OF THE INVENTION

Thus, it is an object of the invention to provide a camera mechanism which avoids all of the aforenoted shortcomings.

It is a further object of the invention to provide a camera mechanism which embodies a few, simple mechanical components.

It is a further object of the invention to provide a camera mechanism which may be readily embodied in camera housings varying in size and shape over a wide range.

It is a still further object of the invention to provide a camera mechanism which is inexpensive to produce, is effective in operation, and is not readily susceptible to malfunctioning.

Further and additional objects will appear from the description, accompanying drawing and appended claims.

In accordance with one embodiment of the invention, a mechanism is provided for use in a camera wherein the latter has a housing, a film chamber, a lens positioned forwardly of and aligned with the film chamber, a manually actuated shutter release for the lens, and a strobe light selectively responsive to the manual actuation of the shutter release. The mechanism includes an on-off switch means and an adjustably mounted diaphragm means. The on-off switch means is mounted on the camera housing and is operatively connected to the strobe light whereby the latter is energized upon actuation of the shutter release only upon the switch means assuming an "on" position. The diaphragm means comprises an opaque element which is pivotally mounted on the housing and is provided with a portion thereof having an opening formed therein of lesser area than the area of the lens. The portion of the element circumjacent the opening forms a substantially wide encircling band. When the diaphragm means is adjusted to an operative position, the opening in the opaque element portion is disposed intermediate the lens and the film chamber and the central axis of the opening is coaxial with the optical axis of the lens. When the diaphragm means is adjusted to an inoperative position, the opaque element is substantially out of registration with the lens. A linkage is provided between the on-off switch means and the diaphragm means whereby movement of the switch means to an "on" position will adjust the diaphragm means to an inoperative position. In a like manner, movement of the switch means to an "off" position will adjust the diaphragm means to an operative position.

DESCRIPTION

For a more complete understanding of the invention, reference should be made to the drawing wherein:

FIG. 1 is a fragmentary perspective view of one form of the camera mechanism, showing in phantom lines, the lens, portions of the camera housing and certain of the components of the diaphragm means in a changed position.

FIG. 2 is a fragmentary top plan view of the mechanism of FIG. 1 and showing in phantom lines the lens, and a portion of the camera housing.

FIG. 3 is a fragmentary front elevational view of the mechanism of FIG. 1, and showing in phantom lines the lens, portions of the camera housing, and the diaphragm means in an inoperative position.

FIG. 4 is a fragmentary sectional view taken along line 4—4 of FIG. 1 and showing the lens in phantom lines.

Referring now to the drawing, one form of the mechanism 10 is shown for use in a camera having the following conventional basic components: a housing, a light-tight film chamber, not shown, formed within the housing, a lens mounted on the housing and positioned forwardly of and in alignment with the film chamber, a manually actuated shutter release, not shown, and a strobe light or flash, not shown. The strobe light or flash may be made integral with the housing or removably mounted thereon. The size and shape of the aforesaid components may be varied as desired. Thus, the mechanism hereinafter described may be incorporated in a variety of camera types.

The mechanism 10, as illustrated, includes an on-off switch 11 which is mounted on the housing, an diaphragm means 12 pivotally mounted on the housing, and a linkage 13 interconnecting an actuator 11a of the switch and a pivotal arm 14 of the diaphragm means 12. The switch 11 is electrically connected to the shutter release and the strobe light so that when the switch actuator 11a is in an "off" position, as seen in FIG. 1, actuation of the shutter release will not cause energizing of the strobe light. When, however, the switch actuator 11a is manually moved in the direction of arrow A (FIG. 1) to the "on" position, the strobe light will be responsive to the shutter release and will become energized upon the shutter release being manually manipulated. To facilitate movement of the switch actuator 11a, a protuberance 11b is provided which projects outwardly through a slot, not shown, formed in the camera housing. The actuator 11a, in the illustrated embodiment, is shown mounted for slidable transverse movement relative to the optical axis of the lens. To obtain the proper sliding motion, the actuator 11a may be provided with an elongated transversely extending slot 11c which slidably accommodates a fixed pin 15 carried within the housing. In lieu of the actuator 11a being slidably mounted, it may be pivotally mounted within the housing.

Movement of the actuator 11a is transmitted to the pivotal arm 14 of the diaphragm means 12 by an elongated inflexible link member 13. The link member is disposed within the housing and is offset relative to the lens. One end 13a of the link member is affixed to the on-off switch actuator 11a. The opposite end 13b of the link member protrudes downwardly and is provided with a slot 13c which may be open-ended. The link member in the illustrated embodiment is mounted so that it will only move in an endwise direction, see arrow B in FIG. 1. The extent and direction of movement of the link member coincides with that of the switch actuator 11a. To maintain the link member in proper relative position with respect to the on-off switch 11 and the diaphragm means 12, it is provided with a pair of elongated longitudinally spaced guide slots 13d and 13e. Slot 13d slidably accommodates a fixed pin 16 carried within the housing and, in a like manner, slot 13e slidably accommodates a fixed pin 17, also carried within the housing. Pin 17 functions as the pivotal axis for arm 14 of the iris means 12. Link member 13 may have numerous offset portions because of its location within the housing and its relation with respect to various components, not shown, contained within the housing.

The diaphragm means 12 as aforenoted includes an elongated element or arm 14. Such an arm is sometimes referred to in the art as a Waterhouse stop. One end 14a of the arm is shaped so as to form a relatively wide band which delimits an opening 14b having a shape similar to that of the lens but of a smaller size and, thus, of a smaller area than the area of the lens exposed to the subject being photographed. The arm end 14a is opaque except for the opening 14b and when the arm 14 is in an operative position, as seen in FIGS. 1 and 3, the central axis of the opening 14b is coaxially aligned with the lens optical axis.

Because of the width of the band encircling the opening 14b, a substantial amount of light passing through the lens is blocked thereby and, thus, reduces the intensity of the light entering the camera interior. Arm 14 is provided with a depending portion 14c which is angularly spaced from opening 14b. The lower terminus of portion 14c is provided with a laterally projecting tongue 14d which is adapted to extend through the slot 13c formed in link member 13, see FIGS. 1, 3 and 4. Thus, the linear or endwise movement of link member 13 is transformed into pivotal movement of the arm 14 through the engagement between the tongue 14d and perimetric segments of the slot 13c.

The arm 14 is retained in either its operative (full lines, FIG. 3) or inoperative (phantom lines, FIG. 3) position with respect to the lens by an elongated leaf-type spring 18 which has one end thereof, not shown, secured within the interior of the housing. The spring 18 is provided with a hump 18a over which the tongue 14d slides as the arm 14 pivots about pin 17. Because of the resiliency of the spring 18, the latter will be deflected downwardly as the tongue slides over the hump (see FIG. 3). Once the tongue has passed the crest of the hump, the spring will return to its upward position as seen in full lines in FIG. 3. Thus, in order to pivot arm 14 to either its operative or inoperative position requires a conscious act on the part of the person using the camera, thereby preventing accidental pivoting of the arm from one position to the other.

When the arm is in an inoperative position, phantom lines FIG. 3, the opening 14b of the arm 14 is out of registration with respect to the lens area.

The size, shape and length of the various components comprising the camera mechanism in question may be varied from that shown and will depend upon the type or style camera embodying the mechanism. Because of the interaction between the on-off switch and the diaphragm means, the strobe light can be energized only when the diaphragm means assumes an inoperative position. Thus, the mechanism provides a foolproof means of controlling energization of the strobe light.

I claim:

1. A mechanism of the type described for use on a camera having a housing provided with a film chamber, a lens positioned forwardly of and aligned with the film chamber, a manually activated shutter release for the lens, and a strobe light selectively responsive to the manual actuation of the shutter release; said mechanism comprising an on-off switch means mountable on the housing for manual movement between "on" and "off" positions and adapted to be operatively connected to the strobe light whereby the latter is energized upon actuation of the shutter release only when said on-off switch means is disposed in an "on" position, an apertured diaphragm adjustably mountable on the housing for movement between an operative position intermediate the film chamber and the lens whereby an aperture of the diaphragm is aligned with the optical axis of the lens, and an inoperative position wherein said diaphragm aperture is substantially out of registration with the lens, said diaphragm being provided with a first complemental portion spaced from said diaphragm aperture, an elongated link member adjustably mountable within the housing and carried by and movable in unison with said on-off switch means, said link member being provided with a second complemental portion in abutting engagement with said first complemental portion whereby movement of said switch means is directly transmitted to said iris to effect movement of the latter to either the operative or inoperative position, and resilient means mountable within the housing and being slidably engaged by a portion of the diaphragm and releasably retaining the latter in either said operative or inoperative position depending upon the relative position of said on-off switch means.

2. The mechanism of claim 1 wherein said diaphragm is mountable for pivotal movement about a fixed axis within the housing and said elongated link member is mountable for rectilinear longitudinal movement within the housing; said diaphragm having a first arm portion projecting from the pivotal axis of said diaphragm and having an aperture formed in the distal end of said first arm portion, and a second arm portion angularly disposed relative to said first arm portion and projecting from said pivotal axis, the distal end of said second arm portion being angularly offset to form a tongue; said tongue extending transversely through a slot formed in said link member and being in slidable engagement with said resilient means.

3. The mechanism of claim 2 wherein the resilient means within the housing comprises an elongated resilient member having one end thereof fixedly mountable within the housing and one surface thereof slidably engaged by the tongue of the diaphragm second arm portion, said resilient member one surface being provided with a hump intermediate the ends thereof, said member being biased whereby the one surface thereof is in continuous positive engagement with said tongue, said tongue being disposed to one side of said hump when said on-off switch means is in an "on" position and disposed on the opposite side of said hump when said on-off switch means is in an "off" position; said resilient member being flexed by said tongue as the latter moves past said hump upon said switch means being manually moved between said "on-off" positions.

* * * * *

UNITED STATES PATENT OFFICE
CERTIFICATE OF CORRECTION

PATENT NO. : 3,925,795

DATED : December 9, 1975

INVENTOR(S) : Walter A. Booth

It is certified that error appears in the above-identified patent and that said Letters Patent are hereby corrected as shown below:

In the references cited under FOREIGN PATENTS OR APPLICATIONS, the patent "1,285,293" should be --1,285,291--.

Column 2, line 36, "an" should be --a--.

Column 4, line 31, "iris" should be --diaphragm--.

Signed and Sealed this twenty-seventh Day of April 1976

[SEAL]

Attest:

RUTH C. MASON
Attesting Officer

C. MARSHALL DANN
Commissioner of Patents and Trademarks